(12) United States Patent  
Johnson

(10) Patent No.: US 9,481,403 B1  
(45) Date of Patent: Nov. 1, 2016

(54) SECURE TRUCK BOX SYSTEM

(71) Applicant: Robert Johnson, Mitchell, SD (US)

(72) Inventor: Robert Johnson, Mitchell, SD (US)

( * ) Notice: Subject to any disclaimer, the term of this patent is extended or adjusted under 35 U.S.C. 154(b) by 18 days.

(21) Appl. No.: 14/749,904

(22) Filed: Jun. 25, 2015

(51) Int. Cl.
*B60R 9/00* (2006.01)
*B62D 33/027* (2006.01)
*B60R 7/02* (2006.01)
*B60R 11/02* (2006.01)
*B60R 11/00* (2006.01)

(52) U.S. Cl.
CPC ............ *B62D 33/0276* (2013.01); *B60R 7/02* (2013.01); *B60R 11/0264* (2013.01); *B60R 2011/004* (2013.01)

(58) Field of Classification Search
CPC . B62D 33/0276; B60R 7/02; B60R 11/0264; B60R 2011/004
See application file for complete search history.

(56) References Cited

U.S. PATENT DOCUMENTS

| | | | |
|---|---|---|---|
| 6,102,474 A | 8/2000 | Daley | |
| 6,467,830 B1 | 10/2002 | Cortright | |
| 6,592,162 B2 | 7/2003 | Felix et al. | |
| 6,626,479 B1 | 9/2003 | Skoug | |
| 6,749,249 B1 * | 6/2004 | Lang | B60J 7/1621 296/100.1 |
| 6,761,387 B2 | 7/2004 | Sloss | |
| 7,052,067 B2 | 5/2006 | Walker | |
| 7,104,583 B2 | 9/2006 | Clare | |
| 7,182,177 B1 | 2/2007 | Simnacher | |
| 8,393,665 B2 | 3/2013 | Vilano et al. | |
| 2003/0127875 A1 | 7/2003 | Hornick | |
| 2011/0001333 A1 * | 1/2011 | Bruestle et al. | B60J 7/1614 296/100.05 |
| 2011/0284602 A1 | 11/2011 | Lamouroux | |
| 2011/0304171 A1 * | 12/2011 | Kalack | B60J 7/1621 296/100.17 |

\* cited by examiner

Primary Examiner — Lori L Lyjak

(57) ABSTRACT

A secure truck box system discretely holds and protects items within a box accessible only using a remote control. The system includes a truck having a sidewall extending along a bed. An enclosure has an open top and a perimeter wall coupled to the bed and the sidewall defining an interior space with the sidewall and the bed. A case is positioned within the interior space. The case has a solid top panel and a storage section extending downwardly from the top panel. A lift elevates and lowers the case. The top panel is coextensive with and obstructs the open top when the case is fully retracted into the interior space. The lift is actuated only by manipulation of a remote control.

14 Claims, 5 Drawing Sheets

SECURE TRUCK BOX SYSTEM

BACKGROUND OF THE DISCLOSURE

Field of the Disclosure

The disclosure relates to truck box systems and more particularly pertains to a new truck box system for discretely holding items within a box accessible only using a remote control.

SUMMARY OF THE DISCLOSURE

An embodiment of the disclosure meets the needs presented above by generally comprising a truck having a sidewall extending along a bed. An enclosure has an open top and a perimeter wall coupled to the bed and the sidewall defining an interior space with the sidewall and the bed. A case is positioned within the interior space. The case has a solid top panel and a storage section extending downwardly from the top panel. A lift elevates and lowers the case. The top panel is coextensive with and obstructs the open top when the case is fully retracted into the interior space. The lift is actuated only by manipulation of a remote control.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
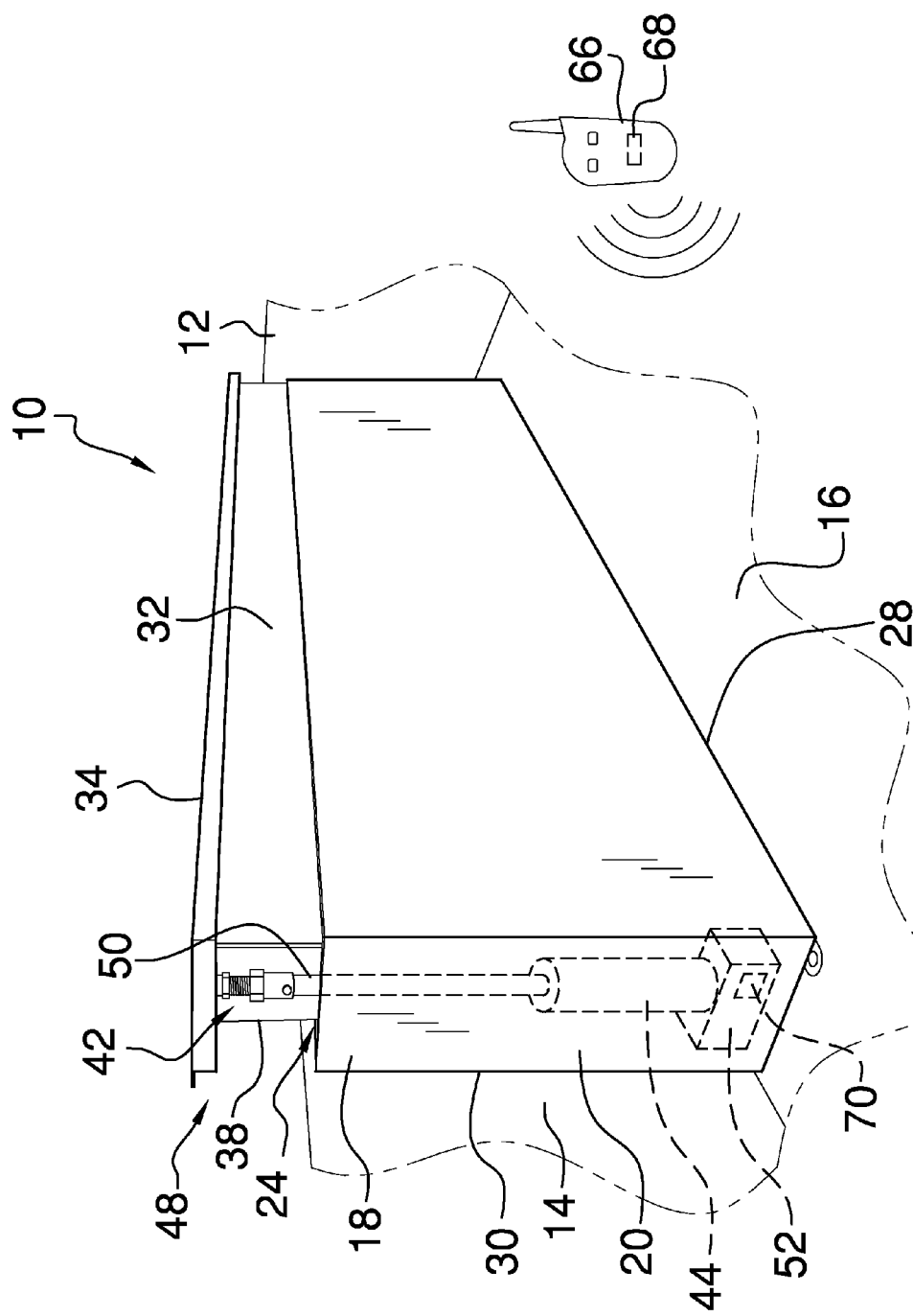
FIG. 1 is a back side perspective view of a secure truck box system according to an embodiment of the disclosure.

With reference now to the drawings, and in particular to FIGS. 1 through 5 thereof, a new truck box system embodying the principles and concepts of an embodiment of the disclosure and generally designated by the reference numeral 10 will be described.

As best illustrated in FIGS. 1 through 5, the secure truck box system 10 generally comprises a truck 12 having a sidewall 14 extending along a bed 16. An enclosure 18 has a perimeter wall 20 coupled to the bed 16 and the sidewall 14 such that the enclosure 18 defines an interior space 22 with the sidewall 14 and the bed 16. The enclosure 18 has an open top 24. The open top 24 of the enclosure 18 is coplanar with a top edge 26 of the sidewall 14 of the truck 12. Either a bottom edge 28 of the enclosure 18 is coupled to the bed 16 or side edges 30 of the enclosure 18 are coupled to the sidewall 14 of the truck 12. Both the bottom edge 28 and side edges 30 may be coupled for additional strength. The bottom edge 28 and side edges 30 may be fastened using conventional fasteners or welded such that the enclosure 18 is fixedly coupled to the bed 16 and the sidewall 14 of the truck 12. Fasteners may be positioned exteriorly or interiorly relative to the enclosure 18 such that the fasteners are either exposed or not exposed, whichever is desired. The enclosure 18 is constructed of durable material such as metal, alloy, or the like such that the enclosure 18 is resistant to being easily removed or damaged. The enclosure 18 may be painted, coated, or otherwise given an appearance which aesthetically blends with the appearance of the truck 12.

A case 32 is positioned within the interior space 22. The case 32 has a top panel 34. The top panel 34 is solid and also constructed of a durable strong material. The case 32 has a storage section 36 extending downwardly from the top panel 34. The storage section 36 have a length providing clearance relative to a wheel well in the bed 16 or structured to extend over and around the wheel well if one is present. The storage section 36 has a pair of lateral walls 38. Each lateral wall 38 is inset relative to an end section 40 of the perimeter wall 20 of the enclosure 18 defining respective end chambers 42 within the interior space 22 between the respective lateral wall 38 and end section 40 of the perimeter wall 20. A lift 44 is coupled to the case 32 such that the lift 44 selectively elevates and lowers the case 32 between a storage position 46 and an extended position 48. The lift 44 comprises a pair of pistons 50. Each of the pistons 50 is positioned within an associated one of the end chambers 42. Each piston 50 is extended by a respective motor 52. Alternatively, a single motor may be employed for operating each piston 50. The motor 52 may be powered by being tied into an existing electrical system of the truck 12.

The top panel 34 extends outwardly from a front side 54 of the storage section 36 defining a flange section 56 of the top panel 34 extending over the top edge 26 of the sidewall 14. The top panel 34 is coextensive with and obstructs the open top 24 when the case 32 is fully retracted into the interior space 22. A seal 58 is coupled to and extends along a bottom surface 60 of the flange section 56. The seal 58 abuts the top edge 26 of the sidewall 14 when the case 32 is fully retracted into the interior space 22. The seal 58 inhibits damage to the top edge 26 of the sidewall 14 and inhibits moisture and debris from entering the interior space 22. Each of a pair of lateral lips 62 is coupled to and extends from an associated end 64 of the top panel 34 such that each of the lateral lips 62 is positioned adjacent to an outer face 64 of an associated one of the end sections 40 of the perimeter wall 20. The top panel 34 including the flange section 56, the lateral lips 62, and the perimeter wall 20 are continuous and devoid of gaps or apertures minimizing potential access points for prying tools or the like. No locks are visible on the exterior of the top panel 34 and enclosure 18. A remote control 66 includes a transmitter 68 which is communicatively coupled to a receiver 70 operationally coupled to the lift 44 such that the lift 44 is actuated only by manipulation of the remote control 66. The remote control

66 may be a conventional handheld and portable device. Alternatively, or in combination with the remote control 66, a switch 84 may be positioned in a cab of the truck 12 and hardwired to the lift 44.

Figure 2:
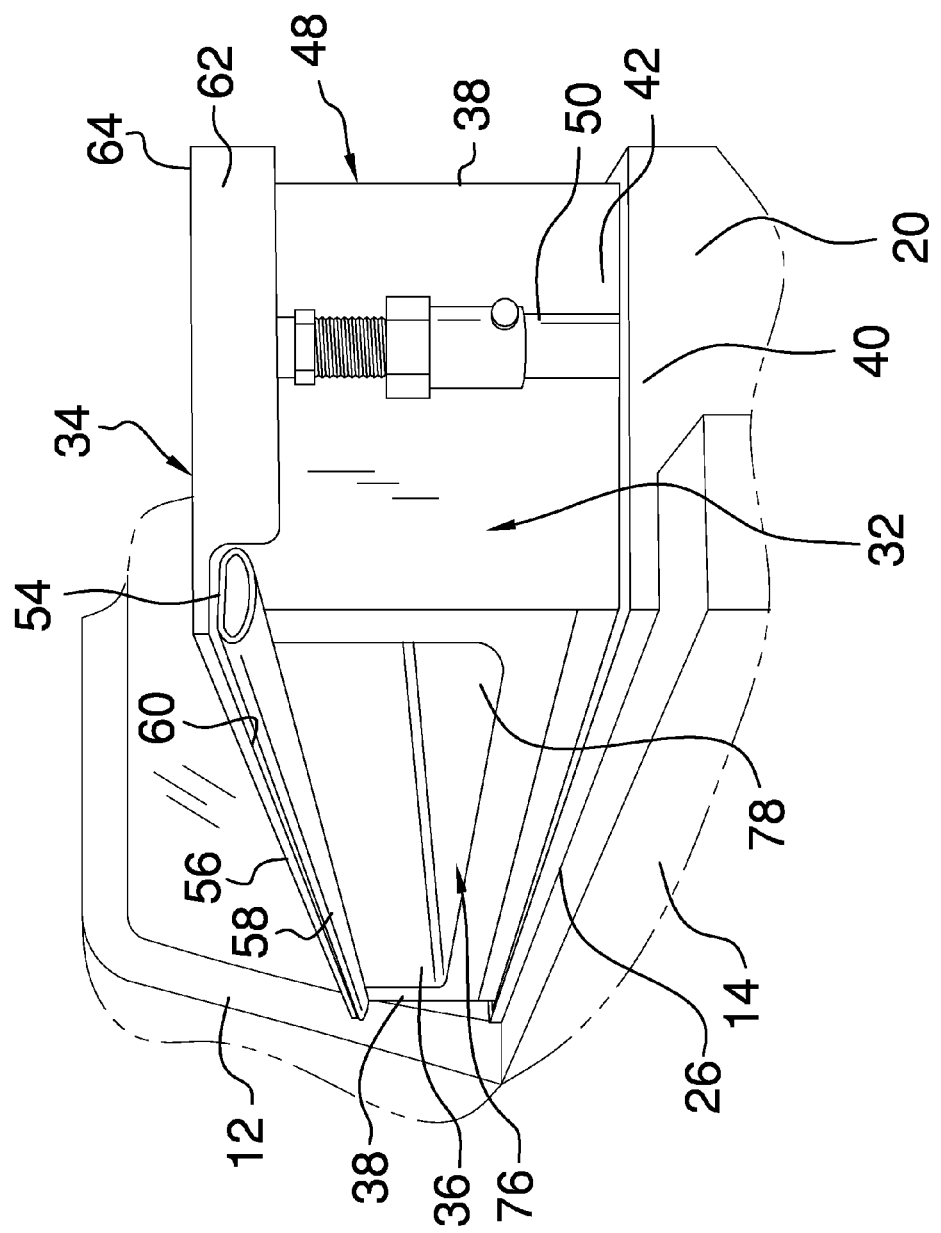
FIG. 2 is a partial front side view of an embodiment of the disclosure in an open position.
Figure 3:
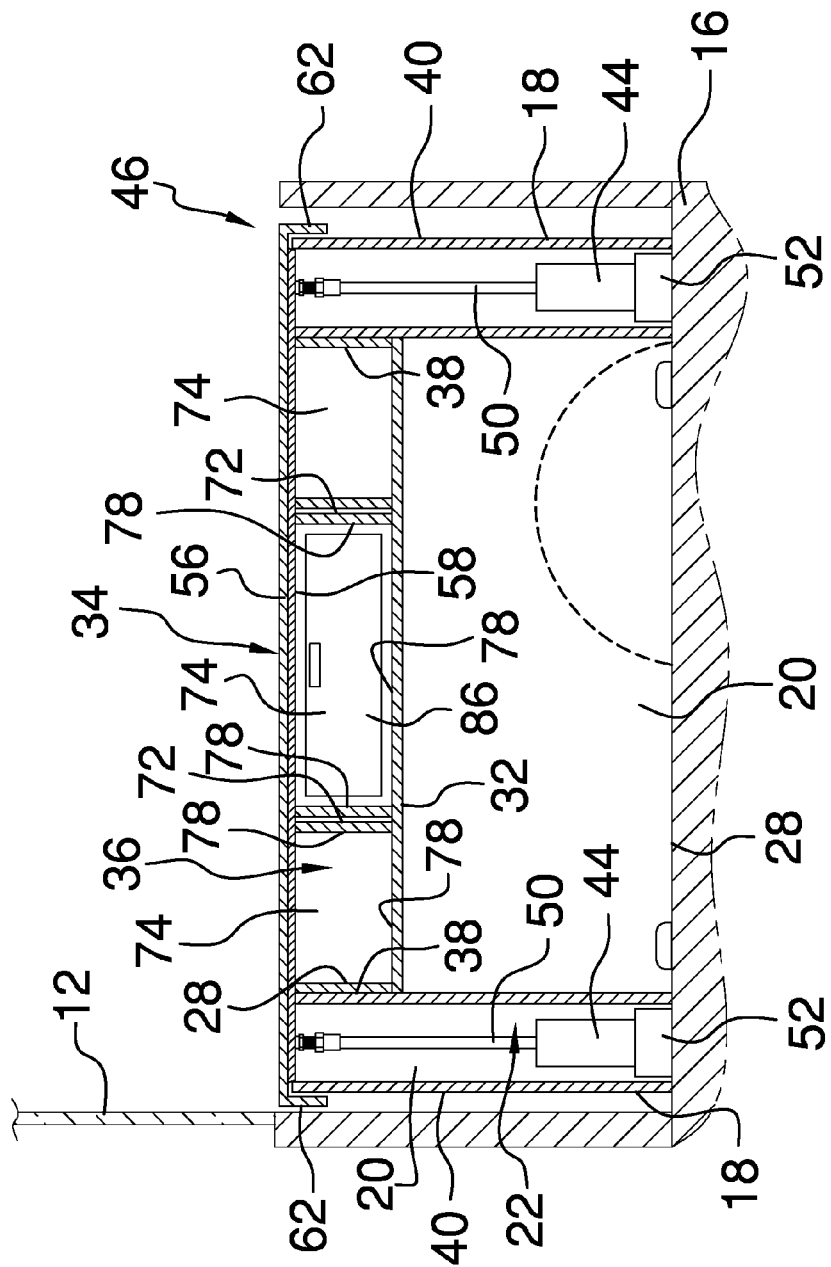
FIG. 3 is a front view of an embodiment of the disclosure in a storage position with a sidewall of a vehicle being cut-away for clarity.
Figure 4:
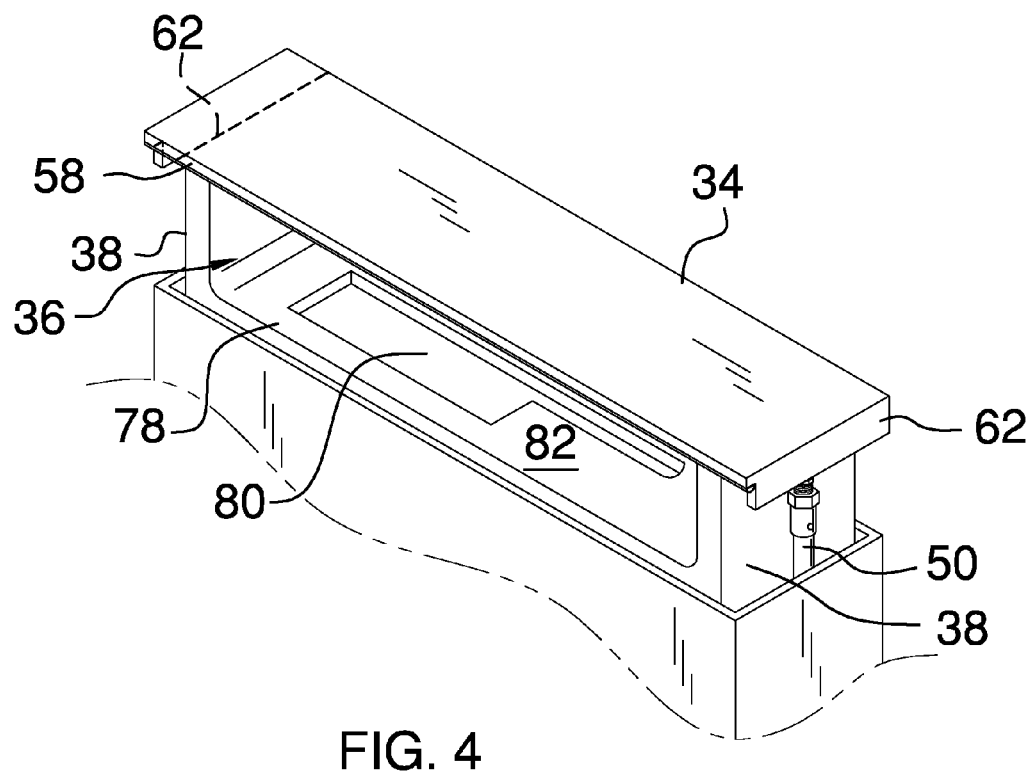
FIG. 4 is a top front side perspective view of an embodiment of the disclosure with the enclosure removed for clarity.
Figure 5:
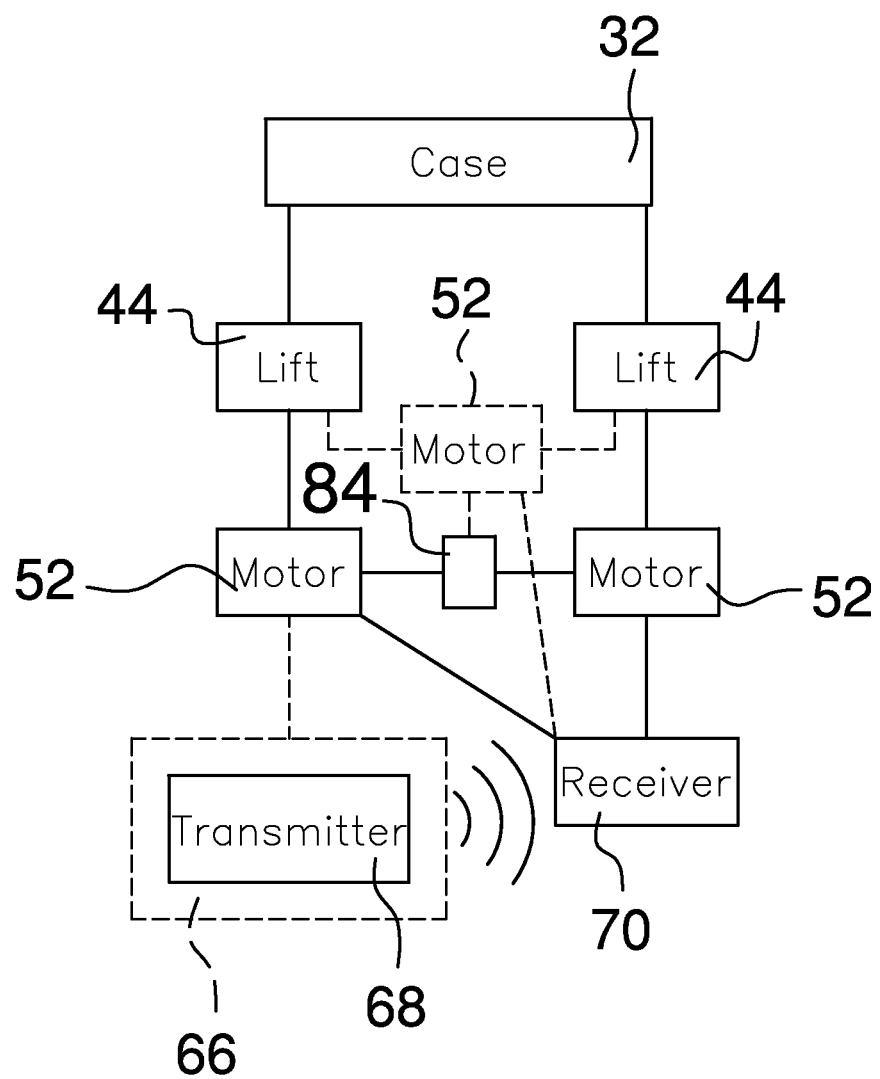
FIG. 5 is a schematic view of an embodiment of the disclosure showing alternative operational control of lifting the case.

The storage section 36 may be configured to store various tools, firearms, or the like. As shown in FIG. 3, the storage section may comprise interior walls 72 defining a plurality of storage chambers 74 within the storage section 36. Alternatively, the storage section 36 may comprise a single chamber 76 as shown in FIGS. 2 and 4. As shown in FIG. 4, a cushion 78 lines the storage section 36 of the case 32. The cushion 78 may extend fully around the single chamber 76. The cushion 78 is structured to have a well 80 extending into an upper surface 82 of the cushion 78. Thus, the cushion 78 is configured for receiving an item, such as a firearm, into the well 80 such that lateral movement of the item is inhibited and the item is protected when the truck 12 is driven. The cushion 78 is shown in the single chamber 76 but multiple cushions may be provided in all or some of the storage chambers 74 of the multiple chamber embodiment. Drawers 86 may also be slidably positioned within the storage section In use, the enclosure 18 is attached to the truck 12 as described above. The case 32 is secured to the bed 16 in alignment with the enclosure 18 to allow the case 32 to be raised and lowered as needed by the lift 44. The device 10 is discrete so as not to draw attention and durable to discourage tampering to access the interior space 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A secure truck box system comprising:
   a truck, said truck having a sidewall extending along a bed;
   an enclosure, said enclosure having a perimeter wall coupled to said bed and said sidewall wherein said enclosure defines an interior space with said sidewall and said bed, said enclosure having an open top;
   a case, said case being positioned within said interior space, said case having a top panel, said top panel being solid, said case having a storage section extending downwardly from said top panel;
   a lift coupled to said case such that said lift selectively elevates and lowers said case between a storage position and an extended position, said top panel being coextensive with and obstructing said open top when said case is fully retracted into said interior space; and
   a remote control, said remote control being operationally coupled to said lift such that said lift is actuated only by manipulation of said remote control.

2. The system of claim 1, further comprising:
   said open top of said enclosure being coplanar with a top edge of said sidewall of said truck; and
   said top panel extending outwardly from a front side of said storage section defining a flange section of said top panel extending over said top edge of said sidewall.

3. The system of claim 2, further comprising a seal coupled to and extending along a bottom surface of said flange section, said seal abutting said top edge of said sidewall when said case is fully retracted into said interior space.

4. The system of claim 1, further comprising a pair of lateral lips, each of said lateral lips being coupled to and extending from an associated end of said top panel such that each of said lateral lips is positioned adjacent to an outer face of an associated end section of said perimeter wall.

5. The system of claim 1, further comprising said storage section having a pair of lateral walls, each said lateral walls being inset relative to an end section of said perimeter wall of said enclosure defining respective end chambers within said interior space between said lateral wall and said end section of said perimeter wall.

6. The system of claim 1, further comprising said lift comprising a pair of pistons, each of said pistons being positioned within an associated one of said end chambers.

7. The system of claim 1, further comprising a cushion lining said storage section of said case.

8. The system of claim 7, further comprising said cushion being structured to have a well extending into an upper surface of said cushion wherein said cushion is configured for receiving an item into said well such that lateral movement of the item is inhibited.

9. The system of claim 1, further comprising said storage section comprising interior walls defining a plurality of storage chambers within said storage section.

10. The system of claim 1, further comprising said enclosure being fixedly coupled to said bed and said sidewalls of said truck.

11. The system of claim 10, further comprising:
    a bottom edge of said enclosure being fastened to said bed; and
    side edges of said enclosure being fastened to said sidewall of said truck.

12. A secure truck box system comprising:
    a truck, said truck having a sidewall extending along a bed;
    an enclosure, said enclosure having a perimeter wall coupled to said bed and said sidewall wherein said enclosure defines an interior space with said sidewall and said bed, said enclosure having an open top, said open top of said enclosure being coplanar with a top edge of said sidewall of said truck;
    a bottom edge of said enclosure being fastened to said bed and side edges of said enclosure being fastened to said sidewall of said truck wherein said enclosure is fixedly coupled to said bed and said sidewalls of said truck;
    a case, said case being positioned within said interior space, said case having a top panel, said top panel being solid, said case having a storage section extending downwardly from said top panel, said storage section having a pair of lateral walls, each said lateral walls being inset relative to an end section of said perimeter wall of said enclosure defining respective end chambers within said interior space between said lateral wall and said end section of said perimeter wall, said top panel extending outwardly from a front side of said storage section defining a flange section of said top panel extending over said top edge of said sidewall;

a seal coupled to and extending along a bottom surface of said flange section, said seal abutting said top edge of said sidewall when said case is fully retracted into said interior space;

a pair of lateral lips, each of said lateral lips being coupled to and extending from an associated end of said top panel such that each of said lateral lips is positioned adjacent to an outer face of an associated end section of said perimeter wall;

a lift coupled to said case such that said lift selectively elevates and lowers said case between a storage position and an extended position, said top panel being coextensive with and obstructing said open top when said case is fully retracted into said interior space, said lift comprising a pair of pistons, each of said pistons being positioned within an associated one of said end chambers; and a remote control, said remote control being operationally coupled to said lift such that said lift is actuated only by manipulation of said remote control.

13. The system of claim 12, further comprising said storage section comprising interior walls defining a plurality of storage chambers within said storage section.

14. The system of claim 12, further comprising a cushion lining said storage section of said case, said cushion being structured to have a well extending into an upper surface of said cushion wherein said cushion is configured for receiving an item into said well such that lateral movement of the item is inhibited.

* * * * *